(12) United States Patent
Miao et al.

(10) Patent No.: US 12,506,650 B2
(45) Date of Patent: Dec. 23, 2025

(54) FREQUENCY DOMAIN RESOURCE DETERMINING METHOD, NODE AND STORAGE MEDIUM

(71) Applicant: ZTE CORPORATION, Shenzhen (CN)

(72) Inventors: Ting Miao, Shenzhen (CN); Weimin Xing, Shenzhen (CN); Feng Bi, Shenzhen (CN); Youxiong Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 329 days.

(21) Appl. No.: 18/552,925

(22) PCT Filed: Mar. 25, 2022

(86) PCT No.: PCT/CN2022/083035
§ 371 (c)(1),
(2) Date: Sep. 28, 2023

(87) PCT Pub. No.: WO2022/206598
PCT Pub. Date: Oct. 6, 2022

(65) Prior Publication Data
US 2024/0171440 A1    May 23, 2024

(30) Foreign Application Priority Data
Apr. 1, 2021   (CN) .......................... 202110357612.6

(51) Int. Cl.
*H04L 27/26* (2006.01)
(52) U.S. Cl.
CPC .... *H04L 27/2613* (2013.01); *H04L 27/26025* (2021.01); *H04L 27/2605* (2013.01)

(58) Field of Classification Search
None
See application file for complete search history.

(56) References Cited

U.S. PATENT DOCUMENTS

2018/0343665 A1 * 11/2018 Yan ................... H04W 72/0453
2019/0350023 A1   11/2019 Novlan et al.
(Continued)

FOREIGN PATENT DOCUMENTS

| CN | 111901871 A | 11/2020 |
|---|---|---|
| WO | WO2020164009 A1 | 8/2020 |
| WO | WO2020167987 A1 | 8/2020 |

OTHER PUBLICATIONS

International Search Report in Application No. PCT/CN2022/083035, dated May 18, 2022, 4 pages, including translation.
(Continued)

*Primary Examiner* — Ayman A Abaza
*Assistant Examiner* — Camquyen Thai
(74) *Attorney, Agent, or Firm* — Morgan, Lewis & Bockius LLP

(57) ABSTRACT

Provided are a frequency domain resource determining method, a node and a storage medium, and the method includes the following: A first node acquires first carrier resource configuration information sent by a control node; the first node determines a first reference carrier of a cell of a distributed unit (DU) of the first node according to the first carrier resource configuration information; and the first node determines at least one frequency domain resource set of the cell of the DU of the first node based on the first reference carrier, where the first reference carrier includes a first starting resource block and N resource blocks starting from the first starting resource block, and N is configured in the first carrier resource configuration information or predefined.

20 Claims, 4 Drawing Sheets

(56) References Cited

U.S. PATENT DOCUMENTS

2023/0180203 A1* 6/2023 Wen .................. H04L 27/26025
370/329
2023/0337206 A1* 10/2023 Peng ................. H04W 72/0453

OTHER PUBLICATIONS

Extended European Search Report in Application No. 22778780.1, dated Feb. 3, 2025, 11 pages, including translation.
Intel Corporation, "Enhancements to Resource Multiplexing between Child and Parent Links of an IAB Node", 3GPP TSG RAN WG1 #104-e, R1-2100670, e-Meeting, Jan. 25-Feb. 5, 2021.

* cited by examiner

FREQUENCY DOMAIN RESOURCE DETERMINING METHOD, NODE AND STORAGE MEDIUM

CROSS-REFERENCES TO RELATED APPLICATIONS

This is a National Stage Application, filed under 35 U.S.C. 371, of International Patent Application No. PCT/CN2022/083035, filed on Mar. 25, 2022, which claims priority to a Chinese patent application No. 202110357612.6 filed on Apr. 1, 2021, the disclosures of which are incorporated herein by reference in their entireties.

TECHNICAL FIELD

The present application relates to the field of wireless communication and, in particular, a frequency domain resource determining method, a node and a storage medium.

BACKGROUND

In the new generation communication system (new radio, NR), networking modes more flexible than 2G, 3G, and 4G systems as well as new types of network nodes are allowed. At present, a new type of node that integrates a backhaul link and a normal NR access link, that is, an integrated access and backhaul (IAB) node, can provide more flexible coverage and networking than single cellular coverage and is an important component in the future mobile communication network.

The IAB network may support multihop, and the IAB node includes two types of logic entities: a mobile-termination (MT) and a distributed unit (DU). The IAB node implements wireless backhaul by accessing a parent node (for example, an IAB node or an IAB donor) through an MT (or referred to as an IAB-MT) and provides service for a child node or a user equipment (UE) through a DU (or referred to as an IAB-DU). Due to the difference in the capabilities of IAB nodes, the IAB-MT and the IAB-DU may transmit data in a time-division multiplexing manner, and the IAB-MT and the IAB-DU may also simultaneously receive and send data, or one of the IAB-MT and the IAB-DU receives data while the other sends data, in a frequency-division multiplexing manner or a space-division multiplexing (or referred to as non-time-division multiplexing) manner. In a non-time-division multiplexing scenario, since one cell usually supports multiple subcarrier spacing-specific carriers, no specific scheme is proposed for determining based on which carrier the frequency domain resource division is performed. The IAB-MT and the IAB-DU may use resources more flexibly and reduce a transmission delay by using the non-time division multiplexing. Therefore, how to determine based on which carrier the frequency domain resource division is performed is urgent to be solved.

SUMMARY

Embodiments of the present application provide a frequency domain resource determining method and apparatus, a node and a storage medium.

The embodiments of the present application provide a frequency domain resource determining method. The method is applied to a first node and includes the following: The first node acquires first carrier resource configuration information sent by a control node; the first node determines a first reference carrier of a cell of a DU of the first node according to the first carrier resource configuration information; and the first node determines at least one frequency domain resource set of the cell of the DU of the first node based on the first reference carrier; where the first reference carrier includes a first starting resource block and N resource blocks starting from the first starting resource block, N is configured in the first carrier resource configuration information or N is predefined.

The embodiments of the present application provide a frequency domain resource determining method. The method is applied to a control node and includes the following: The control node sends first carrier resource configuration information to a first node; where the first carrier resource configuration information is used for determining a first reference carrier of a cell of a DU of the first node, the first reference carrier is used for determining at least one frequency domain resource set of the cell of the DU of the first node, the first reference carrier includes a first starting resource block and N resource blocks starting from the first starting resource block, and N is configured in the first carrier resource configuration information or N is predefined.

The embodiments of the present application provide a frequency domain resource determining apparatus. The apparatus includes an acquisition module and a determination module. The acquisition module is configured to acquire first carrier resource configuration information sent by a control node. The determination module is configured to determine a first reference carrier of a cell of a DU of the apparatus according to the first carrier resource configuration information and is further configured to determine at least one frequency domain resource set of the cell of the DU of the apparatus based on the first reference carrier; where the first reference carrier includes a first starting resource block and N resource blocks starting from the first starting resource block, and N is configured in the first carrier resource configuration information or N is predefined.

The embodiments of the present application provide a frequency domain resource determining apparatus. The apparatus includes a sending module. The sending module is configured to send first carrier resource configuration information to a first node; where the first carrier resource configuration information is used for determining a first reference carrier of a cell of a DU of the first node, the first reference carrier is used for determining at least one frequency domain resource set of the cell of the DU of the first node, the first reference carrier includes a first starting resource block and N resource blocks starting from the first starting resource block, and N is configured in the first carrier resource configuration information or N is predefined.

The embodiments of the present application provide a communication node. The communication node includes a processor, and the processor is configured to, when executing a computer program, implement the frequency domain resource determining method provided by the embodiments of the present application.

The embodiments of the present application provide a read-writeable storage medium. The read-writeable storage medium is configured to store a computer program, and when executed by a processor, the computer program implements the frequency domain resource determining method provided by the embodiments of the present application.

DETAILED DESCRIPTION

To make the objects, schemes and advantages of the present application more apparent, detailed description is given hereinafter to illustrate embodiments of the present application in conjunction with drawings. It is to be noted that if not in collision, the embodiments and features therein in the present application may be combined with each other.

In addition, in the embodiments of the present application, words such as "optionally" or "exemplarily" are used for representing examples, illustrations, or descriptions. Any embodiment or design scheme described as "optional" or "example" in the embodiments of the present application should not be construed as preferred or advantageous over other embodiments or design schemes. Rather, the use of the word "optionally" or "exemplarily" is intended to present related concepts in a concrete manner.

To better understand the schemes provided in the embodiments of the present application, related concepts referred to in the embodiments of the present application are further explained herein as follows:

An IAB donor is typically connected (for example, in a wired manner) to a core network and usually includes a central unit (CU) and one or more distributed units (DUs). The CU logically connects to the DU of an IAB node at each hop and coordinates and configures resources for the IAB node at each hop.

A frequency domain resource set configuration is used for configuring the frequency domain resource set of an IAB-DU cell.

Figure 1:
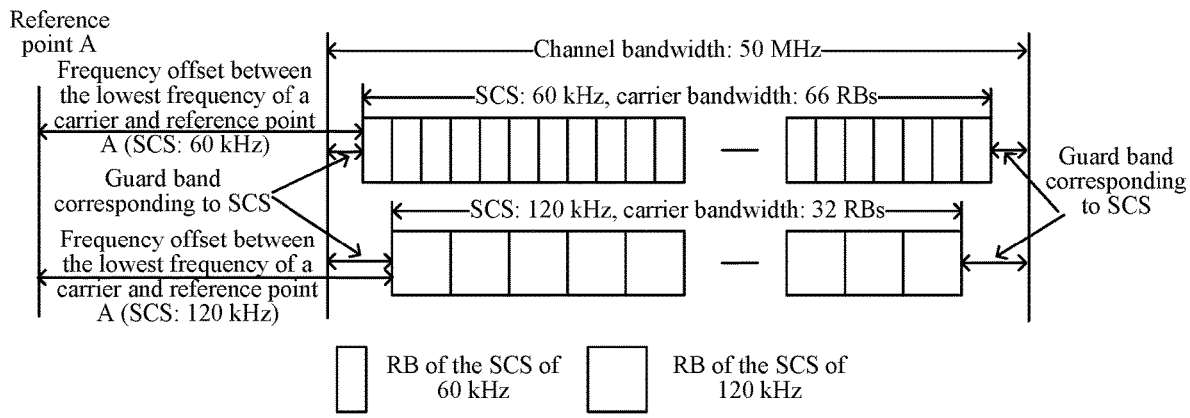
FIG. 1 is a schematic diagram of a 60 kHz subcarrier spacing-specific carrier and a 120 kHz subcarrier spacing-specific carrier corresponding to a carrier having a channel bandwidth of 50 MHz according to an embodiment of the present application.
Figure 2:
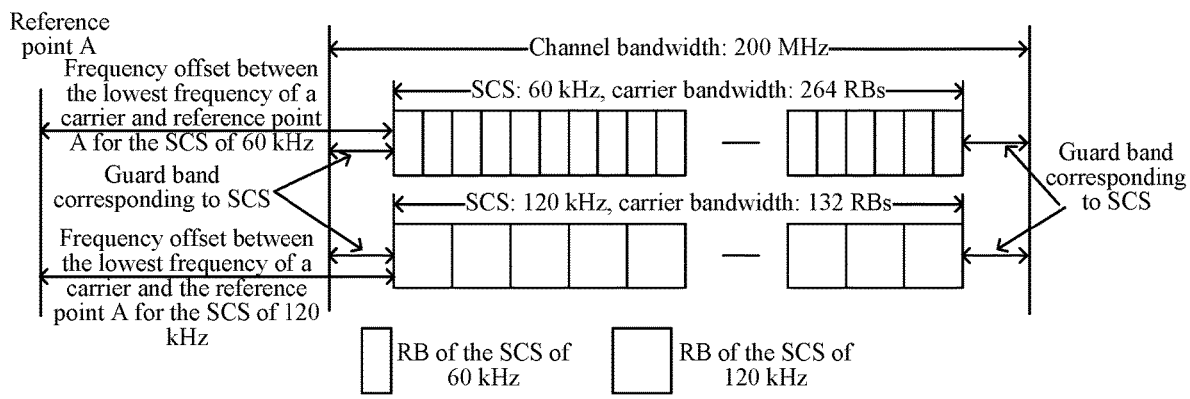
FIG. 2 is a schematic diagram of a 60 kHz subcarrier spacing-specific carrier and a 120 kHz subcarrier spacing-specific carrier corresponding to a carrier having a channel bandwidth of 200 MHz according to an embodiment of the present application.

An IAB-DU reports served cell information to a CU and provides a carrier configuration of each cell. Generally, a cell supports at least one subcarrier spacing (SCS), and one subcarrier spacing corresponds to one SCS-specific carrier. Each time-division duplexing (TDD), each downlink (DL), each uplink (UL) or each supplementary uplink (SUL) of the cell corresponds to a carrier configuration of one cell, and the carrier configuration of the cell includes at least one of frequency information (FreqInfo), a transmission bandwidth, or a carrier list. The frequency information includes at least one of a frequency location of reference point A, an operating frequency band, or whether the frequency is offset by 7.5 kHz. The carrier list contains at least one SCS-specific carrier. The at least one carrier in the carrier list belongs to the same operating frequency band and is configured with respect to the same absolute frequency (subcarrier 0 of common resource block (RB) 0, that is, reference point A), and the absolute frequency is usually indicated through an absolute radio frequency channel number (ARFCN). The configuration parameter of a carrier includes at least one of a subcarrier spacing of the carrier, a frequency offset between the lowest frequency of the carrier and reference point A, or a bandwidth of the carrier. FIG. 1 shows a 60 kHz SCS-specific carrier (with the carrier bandwidth of 66 RBs) and a 120 kHz SCS-specific carrier (with the carrier bandwidth of 32 RBs) corresponding to a carrier having a channel bandwidth of 50 MHz. FIG. 2 shows a 60 kHz SCS-specific carrier (with the carrier bandwidth of 264 RBs) and a 120 kHz SCS-specific carrier (with the carrier bandwidth of 132 RBs) corresponding to a carrier having a channel bandwidth of 200 MHz. Different SCS-specific carriers need to satisfy the smallest guard band requirement and a nested structure. The smallest guard band requirement is predefined. The nested structure indicates that RBs of different subcarrier spacings are aligned. For example, for subcarrier spacings of 60 kHz and 120 kHz, the nested structure indicates that one RB of the subcarrier spacing of 120 kHz is aligned with two RBs of the subcarrier spacing of 60 kHz. A control node may acquire the carrier information of an IAB-DU cell according to the served cell information reported by the IAB-DU.

Figure 3:
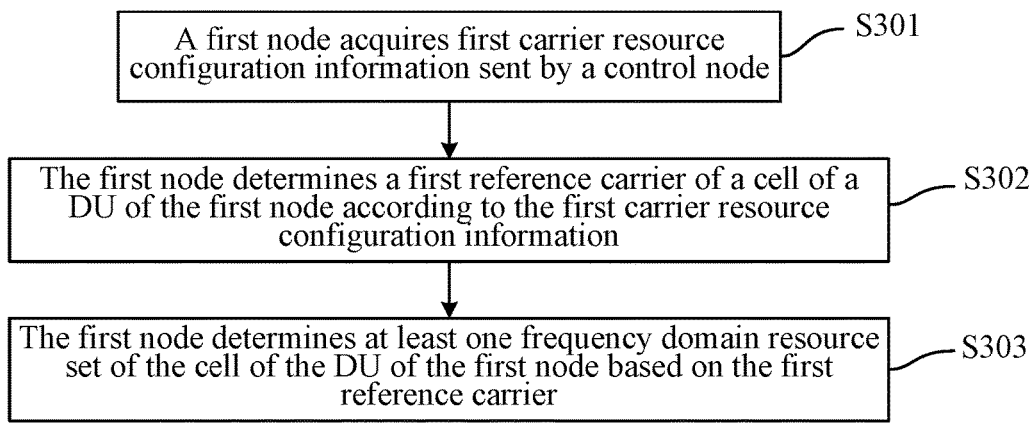
FIG. 3 is a flowchart of a frequency domain resource determining method according to an embodiment of the present application.

FIG. 3 is a flowchart of a frequency domain resource determining method according to an embodiment of the present application. As shown in FIG. 3, the method includes but is not limited to S301 to S303.

In S301, a first node acquires first carrier resource configuration information sent by a control node.

In the embodiments of the present application, when the first node is, for example, an IAB node, the control node and the first node belong to the same IAB network, the control node may be the CU in the network, and the first carrier resource configuration information sent by the control node is the resource configuration information of the first node. Of course, the method provided in the embodiments of the present application may also be applied to other types of wireless communication devices such as a base station.

In S302, the first node determines a first reference carrier of a cell of a DU of the first node according to the first carrier resource configuration information.

In some examples, the first reference carrier determined in the embodiments of the present application may include a first starting resource block and N resource blocks starting from the first starting resource block, N may be configured in the first carrier resource configuration information, or N is predefined.

In S303, the first node determines at least one frequency domain resource set of the cell of the DU of the first node based on the first reference carrier.

The frequency domain resource set is configured based on the first reference carrier. For example, an offset amount of the starting resource block (or the starting resource unit) of the frequency domain resource set with respect to the starting resource block (or the starting resource unit) of the first reference carrier may be configured, and the number of resource blocks (or the number of resource units, that is, the bandwidth of the frequency domain resource set) contained in the frequency domain resource set may be configured or predefined. After the first node determines the first reference carrier, the first node may determine a frequency location of the first reference carrier and thus may further determine at least one frequency domain resource set of the cell of the DU of the first node according to a location relationship between the frequency domain resource set and the first reference carrier.

The embodiments of the present application provide a frequency domain resource determining method. The method includes the following: The first node acquires first carrier resource configuration information sent by a control node; the first node determines a first reference carrier of a cell of a DU of the first node according to the first carrier resource configuration information; and the first node determines at least one frequency domain resource set of the cell of the DU of the first node based on the first reference carrier; where the first reference carrier includes a first starting resource block and N resource blocks starting from the first starting resource block, N is configured in the first carrier resource configuration information, or N is predefined.

In an example, the first carrier resource configuration information sent by the control node may include at least one of a subcarrier spacing or a frequency domain resource set list.

The frequency domain resource set list includes at least one frequency domain resource set, a frequency domain resource set includes one or more resource units, and the configuration parameter of a frequency domain resource set may include at least one of a frequency domain resource set index, the starting resource unit of the frequency domain resource set, or the number of consecutive resource units. Corresponding SCS-specific carriers in the carrier list of the cell of the DU of the first node may be determined based on the subcarrier spacing in the first carrier resource configuration information, and the frequency domain resource set may be determined based on the SCS-specific carriers and the configuration parameter of the frequency domain resource set. As shown in FIG. 1, the carrier list of the cell of the DU includes a 60 kHz SCS-specific carrier and a 120 kHz SCS-specific carrier. If the subcarrier spacing in the first carrier resource configuration information is configured as 60 kHz, the frequency domain resource set is configured based on the 60 kHz SCS-specific carrier. If the subcarrier spacing in the first carrier resource configuration information is configured as 120 kHz, the frequency domain resource set is configured based on the 120 kHz SCS-specific carrier.

In some examples, the preceding frequency domain resource set may be configured in several different manners. The configuration manners include, for example, the manners described below.

In manner 1, the frequency domain resource set is indicated by a resource indication value (RIV). One frequency domain resource set is composed of at least one resource unit, and one RIV may indicate the starting resource unit and the number of consecutive resource units of one frequency domain resource set.

In manner 2, the maximum number of frequency domain resource sets is configured or predefined as N, then the number of frequency domain resource sets is M, and M=min(N, $N^{size}$). The following is defined: $M_1 = N^{size}$ mod M, $K_1$=ceil($N^{size}$/M), and $K_2$=floor($N^{size}$/M). If $M_1 > 0$, the frequency domain resource set (m=0, 1, ..., and $M_1 - 1$) is composed of resource units with indexes of ($m*K_1+k$), where k=0, 1, ..., and $K_1 - 1$. When m for a frequency domain resource set is equal to $M_1, M_1+1, \ldots,$ and $M-1$, the frequency domain resource set is composed of resource units with indexes of $M_1 \cdot K_1 + (m-M_1) \cdot K_2 + k$, where k=0, 1, ..., and $K_2 - 1$, and $N^{size}$ is the number of resource units contained in the carrier.

mod is a modulo (or complementation) operation, ceil( ) represents a ceiling operation, floor( ) represents a floor operation, m may be understood as the frequency domain resource set index, and the carrier may be understood as the carrier (that is, the reference carrier) on which a frequency domain resource set configuration is based. The preceding manner is merely an example and may be determined by other calculation methods.

In manner 3, a starting resource unit index and an ending resource unit index of the frequency domain resource set are indicated. The frequency domain resource set is composed of resource units between the starting resource unit and the ending resource unit.

In some examples, the resource units may be numbered in ascending order of frequency. For example, a resource unit having the lowest frequency of the carrier is numbered 0, a resource unit having the second lowest frequency is numbered 1, and so on.

In the preceding manners, the starting resource unit of the frequency domain resource set is defined with respect to the first resource unit of the reference carrier, that is, the starting resource unit of the frequency domain resource set determined in the preceding manners is an offset amount, and an offset amount of the starting resource unit of the frequency domain resource set with respect to reference point A may be known according to the offset amount (denoted as offset) of the starting resource unit of the reference carrier with respect to the reference point. Therefore, the first node may know the starting frequency location of the frequency domain resource set according to the frequency location of the reference carrier and the configuration of the frequency domain resource set and may know the frequency location of the frequency domain resource set according to the number of resource units contained in the frequency domain resource set. For example, the starting resource unit of the frequency domain resource set is resource unit S (that is, an $(S+1)^{th}$ resource unit) of the reference carrier, and the offset amount of the starting resource unit of the reference carrier with respect to the reference point is offset, then the offset amount of the starting resource unit of the frequency domain resource set with respect to the reference point is (offset+S) resource units. The frequency location of the frequency domain resource set may be known according to the number of resource units contained in the frequency domain resource set.

The resource unit may be a resource block (RB), or a physical resource block, or an RB group, or a physical resource block group, or a precoding resource block group (PRG). The number of RBs contained in the RB group or the number of RBs contained in the PRG may be configured, or predefined, or related to the bandwidth of the reference carrier.

One RB contains 12 subcarriers in the frequency domain, that is, the bandwidth of the RB is 12 times the subcarrier spacing.

The determined frequency domain resource set may be indexed in order of the frequency of the reference carrier from low to high.

Accordingly, in S302, the implementation manner of determining the first reference carrier according to the subcarrier spacing in the first carrier resource configuration information may include one of the following:

The first node determines a carrier whose subcarrier spacing is equal to the subcarrier spacing in the first carrier resource configuration information and which is in a carrier list of the cell of the DU of the first node to be the first reference carrier;

the first node determines a carrier corresponding to the subcarrier spacing in the first carrier resource configuration information, where the carrier is in a carrier list of the cell of the DU of the first node to be the first reference carrier;

the first node determines a starting resource block of a carrier whose subcarrier spacing is equal to the subcarrier spacing in the first carrier resource configuration information and which is in a carrier list of the cell of the DU of the first node to be the first starting resource block; or the first node determines the first starting resource block to be a starting resource block of a carrier in a carrier list of the cell of the DU of the first node, and the carrier list corresponds to the subcarrier spacing in the first carrier resource configuration information.

In some examples, when the first node configures the frequency domain resource set based on an SCS-specific carrier, it may be assumed that the starting frequency location of the carrier is unchanged and the bandwidth of the carrier is a fixed value, for example, 275 RBs.

The first node may determine an SCS-specific carrier corresponding to the subcarrier spacing according to the subcarrier spacing in the first carrier resource configuration information and may determine the frequency domain resource set (or the frequency domain location of the frequency domain resource set) according to the SCS-specific carrier-based frequency domain resource set configuration. For example, if the subcarrier spacing in the first carrier resource configuration information sent by the control node to the first node is 120 kHz, the frequency domain resource set is configured based on the 120 kHz SCS-specific carrier.

In an example, the first carrier resource configuration information may include a frequency domain resource set list.

The frequency domain resource set list includes at least one frequency domain resource set, and the configuration parameter of a frequency domain resource set may include at least one of the following: a frequency domain resource set index, a subcarrier spacing, the starting resource unit of the frequency domain resource set, or the number of consecutive resource units. Each frequency domain resource set is configured based on a carrier corresponding to the subcarrier spacing in the configuration parameter of the frequency domain resource set, and the carrier is in a carrier list of the cell of the DU of the first node.

In an example, the first carrier resource configuration information sent by the control node may include at least one of a first reference carrier configuration or a frequency domain resource set list.

The frequency domain resource set list includes at least one frequency domain resource set, and the configuration parameter of a frequency domain resource set may include at least one of the following: a frequency domain resource set index, the starting resource unit of the frequency domain resource set, or the number of consecutive resource units. The frequency domain resource set may be configured based on the first reference carrier, and the configuration manner may be any one of manner 1, manner 2 or manner 3 described above. Of course, the resource units contained in the frequency domain resource set may be indicated in other manners. For example, for the channel bandwidth of 200 MHz and the subcarrier spacing of 60 kHz, frequency domain resource set 0 is composed of 132 resource units starting from resource unit 0 of the reference carrier, and frequency domain resource set 1 is composed of 132 resource units starting from resource unit 132 of the reference carrier.

Further, the first node may further send a first reference carrier configuration of the cell of the DU of the first node to the control node.

In some examples, the first reference carrier configuration may include at least one of the following: a subcarrier spacing of the reference carrier, a frequency offset between the lowest frequency of the reference carrier and the reference point, a bandwidth of the reference carrier, a frequency band corresponding to the reference carrier or a frequency location of the reference point.

In some examples, the bandwidth of the reference carrier may be predefined.

In some examples, the frequency band corresponding to the reference carrier may be an operating frequency band in a carrier configuration of the cell of the DU of the first node.

In some examples, the frequency location of the reference point may be an absolute frequency (ARFCN) (or the frequency location of the reference point) in the carrier configuration of the cell of the DU of the first node.

In some examples, if the first reference carrier configuration in the first carrier resource configuration information sent by the control node does not include the frequency location of the reference point, the first node may assume that the frequency location of a reference point corresponding to the reference carrier is the same as the frequency location of a reference point corresponding to a carrier of the cell of the DU of the first node, or the first node may assume that the frequency location of a reference point corresponding to the reference carrier is the same as the frequency location of a reference point in a carrier configuration of the cell of the DU of the first node.

In some examples, if the first reference carrier configuration in the first carrier resource configuration information sent by the control node does not include the operating frequency band corresponding to the reference carrier, the first node may assume that the operating frequency band corresponding to the reference carrier is the same as the operating frequency corresponding to a carrier of the cell of the DU of the first node, or the first node may assume that the operating frequency band corresponding to the reference carrier is the same as the operating frequency in the carrier configuration of the cell of the DU of the first node.

In an example, the first carrier resource configuration information may include the frequency domain resource set list. The frequency domain resource set list includes at least one frequency domain resource set. The configuration parameter of a frequency domain resource set may include at least one of the following: a frequency domain resource set index, the starting resource unit of the frequency domain resource set, or the number of consecutive resource units.

The at least one frequency domain resource set in the frequency domain resource set list is configured based on the first reference carrier in the first reference carrier configuration of the cell of the DU of the first node, and the first reference carrier configuration is sent by the first node to the control node. That is, the first node may determine the frequency domain resource set based on the first reference carrier configuration reported by the first node itself and the configuration parameter of the frequency domain resource set in the first carrier resource configuration information.

For example, the first node reports a reference carrier configuration of the cell of the DU of the first node to the control node, and the reference carrier configuration may include at least one of the following: a subcarrier spacing of a reference carrier, a frequency offset between the lowest frequency (for example, the lowest subcarrier) of the reference carrier and the reference point, or a bandwidth of the reference carrier.

The first carrier resource configuration information may include the frequency domain resource set list, and the configuration parameter of a frequency domain resource set may be configured based on the first reference carrier in the first reference carrier configuration. That is, the configuration parameter of the frequency domain resource set is a parameter with respect to the first reference carrier.

Figure 4:
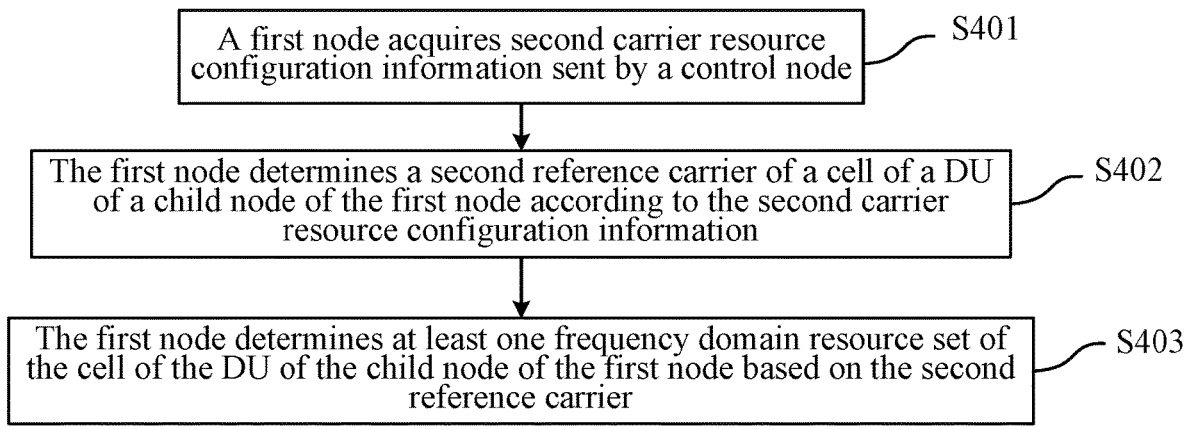
FIG. 4 is a flowchart of another frequency domain resource determining method according to an embodiment of the present application.

As shown in FIG. 4, in an example, an embodiment of the present application further provides an implementation manner, and the implementation manner includes, but is not limited to, S401 to S403.

In S401, the first node acquires second carrier resource configuration information sent by the control node.

The second carrier resource configuration information in S401 may be understood as the carrier resource configuration information of a child node of the first node. Further, the second carrier resource configuration information may be understood as the carrier resource configuration information of a cell of a DU of the child node of the first node.

In S402, the first node determines a second reference carrier of a cell of a DU of a child node of the first node according to the second carrier resource configuration information.

The second reference carrier includes a second starting resource block and M resource blocks starting from the second starting resource block, where M is configured in the second carrier resource configuration information, or M is predefined.

In S403, the first node determines at least one frequency domain resource set of the cell of the DU of the child node of the first node based on the second reference carrier.

The first node configures or schedules resources used by the MT of the child node, and the resources used by the cell of the DU of the child node are configured or scheduled by the child node itself. To avoid a resource conflict between the MT and DU of the child node, the first node needs to acquire a resource configuration of the cell of the DU of the child node. The control node may send the second carrier resource configuration information of the cell of the DU of the child node of the first node to the first node so that the first node determines both the second reference carrier and the frequency domain resource set of the cell of the DU of the child node of the first node according to the second carrier resource configuration information.

In an example, the second carrier resource configuration information includes resource configuration information and carrier configuration information of the cell of the DU of the child node of the first node.

The resource configuration information includes at least one of a subcarrier spacing or a frequency domain resource set list.

The carrier configuration information includes at least one of an ARFCN, an operating frequency band, or a carrier list.

That is, to ensure that the first node and the child node of the first node have a consistent understanding of the resource configuration of the cell of the DU of the child node, the first node needs to determine at least one frequency domain resource set of the cell of the DU of the child node in combination with both the resource configuration information and the carrier configuration information of the cell of the DU of the child node of the first node which are sent by the control node.

In the preceding parameters, the ARFCN may provide the frequency location of the reference point, and the lowest subcarrier of a reference resource block (common resource block 0) of a carrier is the reference point.

The carrier list contains at least one SCS-specific carrier, and the SCS-specific carrier includes at least one of the following: a subcarrier spacing of a carrier, a frequency offset (for example, the frequency offset may be represented by the number of physical resource blocks (using the subcarrier spacing of the carrier) and has a value range of 0 to 2199) between the lowest available subcarrier of the carrier and reference point A, or a bandwidth of the carrier (for example, the bandwidth may be represented by the number of physical resource blocks (using the subcarrier spacing of the carrier) and has a value range of 0 to 275).

Accordingly, in S402, the implementation manner of determining the second reference carrier of the cell of the DU of the child node of the first node according to the subcarrier spacing in the resource configuration information in the second carrier resource configuration information may include one of the following:

The first node determines the second reference carrier to be a carrier whose subcarrier spacing is equal to the subcarrier spacing in the resource configuration information and which is in a carrier list of the cell of the DU of the child node of the first node;

The first node determines a carrier corresponding to the subcarrier spacing in the resource configuration information to be the second reference carrier, and the carrier is in a carrier list of the cell of the DU of the child node of the first node;

The first node determines the second starting resource block of the second reference carrier to be a starting resource block of a carrier whose subcarrier spacing is equal to the subcarrier spacing in the resource configuration information, and the carrier is in a carrier list of the cell of the DU of the child node of the first node; or The first node determines the second starting resource block to be a starting resource block of a carrier in a carrier list of the cell of the DU of the child node of the first node, and the carrier list corresponds to the subcarrier spacing in the resource configuration information.

In an example, the second carrier resource configuration information sent by the control node may include a frequency domain resource set list.

The frequency domain resource set list includes at least one frequency domain resource set, and the configuration parameter of a frequency domain resource set may include at least one of the following: a frequency domain resource set index, a subcarrier spacing, the starting resource unit of the frequency domain resource set, or the number of consecutive resource units. Each frequency domain resource set is configured based on a carrier corresponding to the subcarrier spacing in the configuration parameter of the frequency domain resource set, and the carrier is in the carrier list of the cell of the DU of the child node of the first node.

In an example, the second carrier resource configuration information may include at least one of a second reference carrier configuration or a frequency domain resource set list.

The second reference carrier configuration includes at least one of the following: a subcarrier spacing of a reference carrier, a frequency offset between the lowest frequency of the reference carrier and a reference point, a bandwidth of the reference carrier, a frequency band corresponding to the reference carrier, or a frequency location of the reference point.

In some examples, the bandwidth of the reference carrier may be a fixed value, and for example, the bandwidth of the reference carrier is 275 resource blocks or an integer multiple of 275 resource blocks.

In some examples, one reference carrier corresponds to at least one frequency domain resource set.

In some examples, one frequency domain resource set corresponds to one frequency domain resource set index.

The first node acquires the carrier resource configuration information of a child node of the first node and determines the second reference carrier and at least one frequency domain resource set of the cell of the DU of the child node, that is, the first node and its child node can have the consistent understanding of the resource configuration of the cell of the DU of the child node.

In an example, the second carrier resource configuration information includes at least one of an identity of a cell of the DU of the first node or a frequency domain resource set list, and the cell of the DU of the first node is associated with a resource configuration of the cell of the DU of the child node of the first node.

When both the first node and the child node report the respective carrier configuration of the cell of the DU to the control node, the control node knows which cell of the DU of the first node has the same carrier configuration as the cell of the DU of the child node. Therefore, the control node may send the information of the cell of the DU of the first node to the first node, where the cell of the DU of the first node is associated with the resource configuration of the cell of the DU of the child node of the first node, that is, the control node sends at least one of the frequency domain resource set list or the identity of the cell of the DU of the first node, and the cell of the DU of the first node is associated with the resource configuration of the cell of the DU of the child node of the first node.

The frequency domain resource set list includes at least one frequency domain resource set. The configuration parameter of a frequency domain resource set may include at least one of the following: a frequency domain resource set index, the starting resource unit of the frequency domain resource set, or the number of consecutive resource units.

The frequency domain resource set of the cell of the DU of the child node is configured based on an SCS-specific carrier of the associated cell of the DU of the first node or is configured based on the reference carrier (on which the frequency domain resource set of the cell of the DU of the first node is based) of the cell of the DU of the first node. The configuration manner may be the preceding manner 1, manner 2 or manner 3; alternatively, the resource units included in the frequency domain resource set may be indicated in other manners.

In such an implementation manner, the control node only needs to provide the first node with the identity of the cell of the DU of the first node, where the cell is associated with the frequency domain resource set of the cell of the DU of the child node, and the control node does not need to provide the carrier configuration of the cell of the DU of the child node, thereby saving the signaling overhead.

Accordingly, according to the identity of the cell of the DU of the first node which is sent by the control node, the first node may acquire based on which carrier of the cell of the DU of the first node is the frequency domain resource set of the cell of the DU of the child node configured, and the first node may determine the frequency domain resource set of the cell of the DU of the child node in combination with the frequency domain resource set configuration of the cell of the DU of the child node, where the frequency domain resource set configuration is provided by the control node for the first node.

In some examples, the frequency domain resource set of the cell of the DU of the child node may be the same as the frequency domain resource set of the associated cell of the DU of the first node, or the second reference carrier is the same as the reference carrier of the associated cell of the DU of the first node. The first node may determine the frequency domain resource set of the cell of the DU of the child node based on the identity of the associated cell of the DU of the first node and the frequency domain resource set of the cell of the DU of the first node.

If the first node acquires the identity of the associated cell of the DU of the first node but does not acquire the frequency domain resource set list of the cell of the DU of the child node, it is considered that the frequency domain resource set of the cell of the DU of the child node is the same as the frequency domain resource set of the associated cell of the DU of the first node.

In some examples, alternatively, the resource configuration of the cell of the DU of the child node provided by the control node for the first node may include indication information for indicating whether the frequency domain resource set of the cell of the DU of the child node is the same as the frequency domain resource set of the associated cell of the DU of the first node.

It is to be understood that in the embodiments of the present application, the method by which the control node provides the child node of the first node with the resource configuration of the DU of the child node of the first node is the same as the method by which the control node provides the first node with the resource configuration of the DU of the first node, and the details are not repeated herein.

In an example, for the TDD (including UL or DL) of a cell, at least one frequency domain resource set of the TDD may be acquired using the preceding method.

In an example, for the DL of the cell, at least one frequency domain resource set of the DL may be acquired using the preceding method.

In an example, for the UL of the cell, at least one frequency domain resource set of the UL may be acquired using the preceding method.

In an example, for the SUL of the cell, at least one frequency domain resource set of the SUL may be acquired using the preceding method.

In an example, the first node may further acquire the resource configuration of a cell of the DU of another node sent by the control node. For example, the first node and a second node provide service for the same child node, the control node provides the first node with the resource configuration of the cell of the DU of the second node, and the control node provides the second node with the resource configuration of the cell of the DU of the first node so that the first node and the second node know the resource configuration of the cell of the DU of each other, thereby avoiding the resource conflict.

In an example, the first node may further configure a frequency domain resource attribute based on the preceding determined frequency domain resource set.

In an example, the configured frequency domain resource attribute may include at least one of a slot format configuration or a resource attribute configuration. The slot format configuration may be used for indicating a direction of symbols in a slot of the cell of the DU of the first node and includes at least one of a slot format configuration period, a slot index, or choice{explicit format, implicit format}.

The explicit format includes at least one of the following: an arrangement order indication of the direction of symbols in a slot, the number of downlink symbols in a slot, or the number of uplink symbols in a slot. The implicit format includes a slot format index. The preceding choice {explicit format, implicit format} represents one of the two formats. That is, for one slot, the direction of symbols in the slot is configured using either one of the explicit format or the implicit format.

The arrangement order indication of the direction of symbols in the slot indicates whether the arrangement order of the direction of symbols in the slot is "downlink-flexible-uplink (denoted as DFU)" or "uplink-flexible-downlink (denoted as UFD)".

The slot format index may be a serial number of one slot within one slot format configuration period or within a fixed length of time (for example, when the fixed length of time is 10 milliseconds and the subcarrier spacing is 480 kHz, the number of slots is 320). One slot format defines the direction of symbols in one slot, different slot formats may be predefined, and each slot format corresponds to one slot format index.

In some examples, the DU of the first node may assume that a symbol whose direction is not configured/indicated is a flexible symbol.

One slot is generally composed of several orthogonal frequency division multiplexing (OFDM) symbols. The length of an OFDM symbol is determined by a parameter set (numerology) of the OFDM symbol, and the parameter set includes the subcarrier spacing, a cyclic prefix length, etc.

The resource attribute configuration is used for configuring an attribute of a time-frequency resource of the cell of the DU of the first node. The frequency domain granularity is a frequency domain resource set, and the time domain granularity is a slot or the direction of symbols in a slot.

In some examples, one frequency domain resource set and one direction of symbols in one slot correspond to (or constitute) one time-frequency resource unit, or one frequency domain resource set and one slot correspond to (or constitute) one time-frequency resource unit.

In some examples, one time-frequency resource unit corresponds to one resource attribute, and the resource attribute includes at least one of hard (H), soft (S) or unavailable (or not available, NA).

Figure 5:
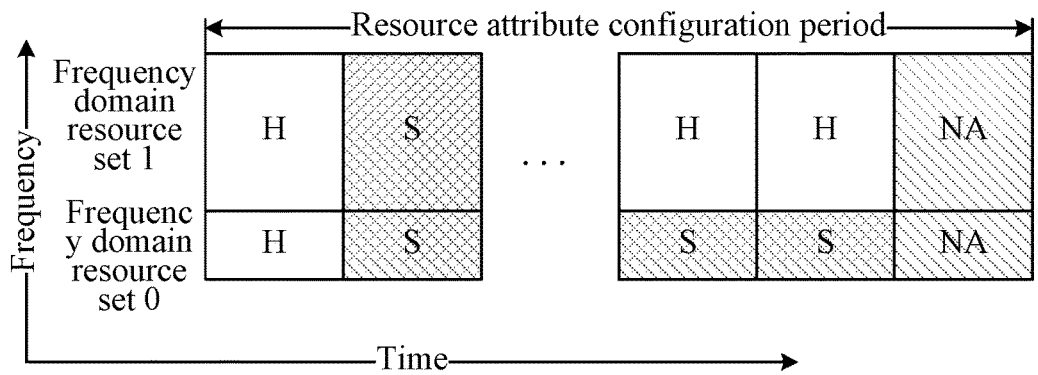
FIG. 5 is a schematic diagram of a resource attribute configuration of a carrier of a cell according to an embodiment of the present application.

For example, for one frequency domain resource set, resource attributes are separately configured for different directions of symbols in a slot. The resource attribute includes at least one of hard (H), soft (S) or unavailable (or not available, NA). FIG. 5 is a schematic diagram of a resource attribute configuration of a carrier of one cell. The carrier of this cell is divided into two frequency domain resource sets. A time-frequency resource composed of one frequency domain resource set and one slot is configured with one resource attribute, or a time-frequency resource composed of one frequency domain resource set and one direction of symbols in one slot is configured with one resource attribute.

A hard resource represents a resource that may be used by the DU of the first node. An unavailable resource represents a resource that cannot be used by the DU of the first node. A soft resource represents a resource that may be used only when the DU of the first node meets conditions, for example, in a case where the first node explicitly indicates through signaling that the soft resource may be used, or in a case where the DU of the first node itself implicitly determines that the soft resource may be used, or in a case where it is determined that the first node does not use the soft resource.

In addition, the resource for the DU of the first node to send or receive a special signal or channel is equivalently configured as Hard. The sent or received special signal or channel includes at least one of the following: a sent synchronization signal and physical broadcast channel block (SSB), a sent physical downlink control channel (PDCCH) corresponding to a common search space set (which may be carried in a pdcchConfigSIB1, searchSpaceSIB1 or searchSpaceZero cell) of a PDCCH of type 0, a received physical random access channel (PRACH), a received scheduling request (SR), a sent periodic channel state information reference signal (CSI-RS), sent system information (SI), received semi-static uplink transmission, or sent semi-static downlink transmission.

In an example, a subcarrier spacing referred by the frequency domain resource set and a subcarrier spacing referred by the slot format configuration may be the same, that is, the subcarrier spacings correspond to the same parameter.

In an example, a subcarrier spacing corresponding to the frequency domain granularity of the resource attribute configuration is the subcarrier spacing referred by the frequency domain resource set.

In an example, a subcarrier spacing corresponding to the time domain granularity of the resource attribute configuration is the subcarrier spacing referred by the slot format configuration.

In an example, if the subcarrier spacing referred by the slot format configuration and the subcarrier spacing referred by the frequency domain resource set are different, a slot format corresponding to the subcarrier spacing referred by the frequency domain resource set is determined according to the relationship between the two referred subcarrier spacings and the slot format configuration, and the resource attribute is configured based on the frequency domain resource set and the determined slot format corresponding to the subcarrier spacing referred by the frequency domain resource set.

It is to be noted that the subcarrier spacing referred by the frequency domain resource set in the preceding examples and the subcarrier spacing of the reference carrier are the same parameter.

Further, in the embodiments of the present application, one TDD carrier of a TDD cell corresponds to one piece of resource configuration information. One TDD carrier corresponds to at least one SCS-specific carrier. For the TDD cell, the carrier configuration includes at least one of the following parameters: carrier frequency information, a transmission bandwidth, or a carrier list.

One UL carrier and one DL carrier of a frequency-division duplex (FDD) cell correspond to one piece of resource configuration information, respectively. One UL carrier corresponds to at least one SCS-specific carrier, and one DL carrier corresponds to at least one SCS-specific carrier. For the FDD cell, the UL carrier configuration includes at least one of the following parameters: carrier frequency information, a transmission bandwidth, or a carrier list, and the DL carrier configuration also includes at least one of the following parameters: carrier frequency information, a transmission bandwidth, or a carrier list.

In some examples, if the cell of the DU of the first node is configured with a supplementary uplink (SUL) carrier, the SUL carrier corresponds to one piece of resource configuration information. One SUL carrier corresponds to at least one SCS-specific carrier. For the SUL, the SUL carrier configuration includes at least one of the following parameters: carrier frequency information, a transmission bandwidth, or a carrier list.

The carrier frequency information includes at least one of the following parameters: a frequency location of a reference point, an operating frequency band, or whether a frequency is offset by 7.5 kHz.

The configuration of each carrier in the carrier list includes at least one of the following parameters: a subcarrier spacing of the carrier, a frequency offset between the lowest frequency of the carrier and a reference point, or a bandwidth of the carrier.

For the TDD, uplink, downlink or supplementary uplink of a cell, the carrier list contains at least one SCS-specific carrier.

It is to be noted that the entity that implements the logic functions of the IAB node, MT and DU in the method provided in the embodiments of the present application is not limited to the embodiments of the present application. For example, the IAB node may be understood as a relay node or a donor node, the MT may be understood as a terminal entity, and the DU may be understood as a base station entity.

Figure 6:
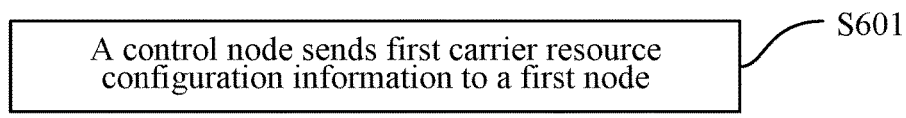
FIG. 6 is a flowchart of another frequency domain resource determining method according to an embodiment of the present application.

FIG. 6 is a flowchart of another frequency domain resource determining method according to an embodiment of the present application. The method may be applied to a control node, and as shown in FIG. 6, the method includes but is not limited to S601.

In S601, a control node sends first carrier resource configuration information to a first node.

In the embodiments of the present application, the first node may be an IAB node, the control node and the first node belong to the same IAB network, and the first carrier resource configuration information sent by the control node is the resource configuration information of the first node.

The first carrier resource configuration information is used for determining a first reference carrier of a cell of a DU of the first node, the first reference carrier is used for determining at least one frequency domain resource set of the cell of the DU of the first node, and the first reference carrier includes a first starting resource block and N resource blocks starting from the first starting resource block, where N is configured in the first carrier resource configuration information or predefined.

In some examples, the first carrier resource configuration information may include at least one of a subcarrier spacing or a frequency domain resource set list.

The frequency domain resource set list includes at least one frequency domain resource set, a frequency domain resource set includes one or more resource units, and the configuration parameter of a frequency domain resource set may include at least one of the following: a frequency domain resource set index, the starting resource unit of the frequency domain resource set, or the number of consecutive resource units. A corresponding SCS-specific carrier in the carrier list of the cell of the DU of the first node may be determined based on the subcarrier spacing in the first carrier resource configuration information, and the frequency domain resource set may be determined based on the SCS-specific carrier and the configuration parameter of the frequency domain resource set. In some examples, the frequency domain resource set may be configured in several different manners. The configuration manners include, for example, the manners described below.

In manner 1, the frequency domain resource set is indicated through a resource indication value (RIV). One frequency domain resource set is composed of at least one resource unit, and one RIV may indicate the starting resource unit and the number of consecutive resource units of one frequency domain resource set.

In manner 2, the maximum number of frequency domain resource sets is configured or predefined as N, then the number of frequency domain resource sets is M, and M=min (N, $N^{size}$). The following is defined: $M_1=N^{size}$ mod M, $K_1$=ceil($N^{size}$/M), and $K_2$=floor($N^{size}$/M). If $M_1>0$, the frequency domain resource set (m=0, 1, . . . , and $M_1-1$) is composed of resource units with indexes of ($m*K_1+k$), where k=0, 1, . . . , and $K_1-1$. When m for a frequency domain resource set is equal to $M_1$, $M_1+1$, . . . , and M−1, the frequency domain resource set is composed of resource units with indexes of $M_1 \cdot K_1+(m-M_1) \cdot K_2+k$, where k=0, 1, . . . , and $K_2-1$, and $N^{size}$ is the number of resource units included in the carrier.

mod is a modulo (or complementation) operation, ceil( ) represents a ceiling operation, floor( ) represents a floor operation, m may be understood as a frequency domain resource set index, and the carrier may be understood as the carrier (that is, the reference carrier) on which a frequency domain resource set configuration is based. The preceding manner is merely an example and may be determined by other calculation methods.

In manner 3, a starting resource unit index and an ending resource unit index of the frequency domain resource set are indicated. The frequency domain resource set is composed of resource units between the starting resource unit and the ending resource unit.

In some examples, the resource units may be numbered in ascending order of frequency. For example, a resource unit having the lowest frequency of the carrier is numbered 0, a resource unit having the second lowest frequency is numbered 1, and so on.

In the preceding manners, the starting resource unit of the frequency domain resource set is defined with respect to the first resource unit of the reference carrier, that is, the starting resource unit of the frequency domain resource set determined in the preceding manners is an offset amount, and an offset amount of the starting resource unit of the frequency domain resource set with respect to reference point A may be known according to the offset amount (denoted as offset) of the starting resource unit of the reference carrier with respect to the reference point. Therefore, the first node may know the starting frequency location of the frequency domain resource set according to the frequency location of the reference carrier and the configuration of the frequency domain resource set and may know the frequency location of the frequency domain resource set according to the number of resource units included in the frequency domain resource set. For example, the starting resource unit of the frequency domain resource set is resource unit S (that is, an $(S+1)^{th}$ resource unit) of the reference carrier, the offset amount of the starting resource unit of the reference carrier with respect to the reference point is offset, then the offset amount of the starting resource unit of the frequency domain resource set with respect to the reference point is (offset+S) resource units. The frequency location of the frequency domain resource set may be known according to the number of resource units included in the frequency domain resource set.

The resource unit may be a resource block (RB), or a physical resource block, or an RB group, or a physical resource block group, or a precoding resource block group (PRG). The number of RBs contained in the RB group or the number of RBs contained in the PRG may be configured, or predefined, or related to the bandwidth of the reference carrier.

One RB contains 12 subcarriers in the frequency domain, that is, the bandwidth of the RB is 12 times the subcarrier spacing.

The determined frequency domain resource set may be indexed in order of the frequency of the reference carrier from low to high.

In an example, the first carrier resource configuration information sent by the control node may include a frequency domain resource set list.

The frequency domain resource set list includes at least one frequency domain resource set, and the configuration parameter of a frequency domain resource set may include at least one of the following: a frequency domain resource set index, a subcarrier spacing, the starting resource unit of the frequency domain resource set, or the number of consecutive resource units. Each frequency domain resource set is configured based on a carrier corresponding to the subcarrier spacing in the configuration parameter of the frequency domain resource set, and the carrier is in a carrier list of the cell of the DU of the first node.

Alternatively, the first carrier resource configuration information may include at least one of a first reference carrier configuration or a frequency domain resource set list.

The frequency domain resource set list includes at least one frequency domain resource set, and the configuration parameter of a frequency domain resource set may include at least one of the following: a frequency domain resource set index, the starting resource unit of the frequency domain resource set, or the number of consecutive resource units. The frequency domain resource set may be configured based on the first reference carrier, and the configuration manner may be any one of manner 1, manner 2 or manner 3 described above. Of course, the resource units included in the frequency domain resource set may be indicated in other manners.

In an example, the control node may further receive a first reference carrier configuration of the cell of the DU of the first node sent by the first node. For example, the first reference carrier configuration includes at least one of the following: a subcarrier spacing of a reference carrier, a frequency offset between the lowest frequency of the reference carrier and the reference point, a bandwidth of the reference carrier, a frequency band corresponding to the reference carrier, or a frequency location of the reference point.

In an example, the first carrier resource configuration information may include the frequency domain resource set list, and the frequency domain resource set list includes at least one frequency domain resource set. The configuration parameter of a frequency domain resource set may include at least one of the following: a frequency domain resource set index, the starting resource unit of the frequency domain resource set, or the number of consecutive resource units. The frequency domain resource set list is configured based on a first reference carrier in the first reference carrier configuration of the cell of the DU of the first node sent by the first node to the control node.

For example, the control node receives the first reference carrier configuration of the cell of the DU of the first node reported by the first node, and the first reference carrier configuration may include at least one of the following:
the subcarrier spacing of the reference carrier, a frequency offset between the lowest frequency (for example, the lowest subcarrier) of the reference carrier and reference point A, a bandwidth of the reference carrier, a frequency band corresponding to the reference carrier, or a frequency location of the reference point.

In the embodiments of the present application, the control node may further send second carrier resource configuration information to the first node, the second carrier resource configuration information is used for determining a second reference carrier of a cell of a DU of a child node of the first node, the second reference carrier is used for determining at least one frequency domain resource set of the cell of the DU of the child node of the first node, and the second reference carrier includes a second starting resource block and M resource blocks starting from the second starting resource block, where M is configured in the second carrier resource configuration information or predefined.

In some examples, the second carrier resource configuration information includes resource configuration information and carrier configuration information of the cell of the DU of the child node of the first node.

The resource configuration information includes at least one of a subcarrier spacing or a frequency domain resource set list.

The carrier configuration information includes at least one of an ARFCN, an operating frequency band or a carrier list.

In the preceding parameters, the ARFCN may provide the frequency location of the reference point, and the lowest subcarrier of a reference resource block (common resource block 0) of a carrier is the reference point.

The carrier list contains at least one SCS-specific carrier, and the SCS-specific carrier includes at least one of the following: a subcarrier spacing of the carrier, a frequency offset (for example, the frequency offset may be represented by the number of physical resource blocks (using the subcarrier spacing defined for the carrier) and has a value range of 0 to 2199) between the lowest available subcarrier of the carrier and reference point A, or a bandwidth of the carrier (for example, the bandwidth may be represented by the number of physical resource blocks (using the subcarrier spacing defined for the carrier) has a value range of 0 to 275).

In an example, the second carrier resource configuration information sent by the control node may include a frequency domain resource set list.

The frequency domain resource set list includes at least one frequency domain resource set, and the configuration parameter of a frequency domain resource set may include at least one of the following: a frequency domain resource set index, a subcarrier spacing, the starting resource unit of the frequency domain resource set, or the number of consecutive resource units. Each frequency domain resource set is configured based on a carrier corresponding to the subcarrier spacing in the configuration parameter of the frequency domain resource set, and the carrier is in a carrier list of the cell of the DU of the child node of the first node.

In an embodiment, alternatively, the second carrier resource configuration information may include at least one of a second reference carrier configuration or a frequency domain resource set list.

The second reference carrier configuration includes at least one of the following: a subcarrier spacing of the reference carrier, a frequency offset between the lowest frequency of the reference carrier and a reference point, a bandwidth of the reference carrier, a frequency band corresponding to the reference carrier, or a frequency location of the reference point.

In an example, the second carrier resource configuration information includes at least one of an identity of a cell of the DU of the first node or a frequency domain resource set list, where the cell of the DU of the first node is associated with a resource configuration of the cell of the DU of the child node of the first node.

For example, in a case where the control node acquires the carrier configuration of the cell of the DU of the first node and the carrier configuration of the cell of the DU of the child node of the first node, the control node knows which cell of the DU of the first node has the same carrier configuration as the cell of the DU of the child node. Therefore, the control node may send to the first node the cell of the DU of the first node which is associated with the resource configuration of the cell of the DU of the child node of the first node, that is, the control node sends at least one of the frequency domain resource set list or the identity of the cell of the DU of the first node which is associated with the resource configuration of the cell of the DU of the child node of the first node.

In some examples, a frequency domain resource set of the cell of the DU of the child node of the first node is the same as a frequency domain resource set of the associated cell of the DU of the first node.

In some examples, the second reference carrier is the same as the reference carrier of the associated cell of the DU of the first node.

Figure 7:
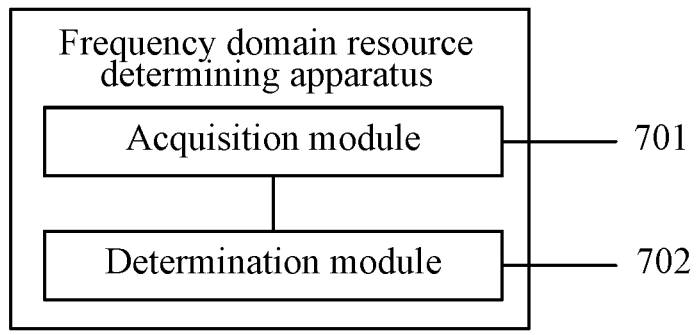
FIG. 7 is a structure diagram of a frequency domain resource determining apparatus according to an embodiment of the present application.

FIG. 7 shows a frequency domain resource determining apparatus according to an embodiment of the present application. As shown in FIG. 7, the apparatus may include an acquisition module 701 and a determination module 702.

The acquisition module is configured to acquire first carrier resource configuration information sent by a control node.

The determination module is configured to determine a first reference carrier of a cell of a DU of the apparatus according to the first carrier resource configuration information.

The determination module is further configured to determine at least one frequency domain resource set of the cell of the DU of the apparatus based on the first reference carrier.

The first reference carrier includes a first starting resource block and N resource blocks starting from the first starting resource block, and N is configured in the first carrier resource configuration information, or N is predefined.

In some examples, the first carrier resource configuration information includes at least one of a subcarrier spacing or a frequency domain resource set list.

In an example, the determination module may be configured to determine the first reference carrier to be a carrier whose subcarrier spacing is equal to the subcarrier spacing in the first carrier resource configuration information and which is in a carrier list of the cell of the DU of the apparatus.

Alternatively, the determination module is configured to determine a carrier corresponding to the subcarrier spacing in the first carrier resource configuration information to be the first reference carrier, where the carrier is in a carrier list of the cell of the DU of the first node.

Alternatively, the determination module is configured to determine the first starting resource block to be a starting resource block of a carrier in a carrier list of the cell of the DU of the first node, where the carrier list corresponds to the subcarrier spacing in the first carrier resource configuration information.

Alternatively, the determination module is configured to determine the first starting resource block to be a starting resource block of a carrier whose subcarrier spacing is equal to the subcarrier spacing in the first carrier resource configuration information and which is in a carrier list of the cell of the DU of the apparatus.

In an example, the first carrier resource configuration information may include a frequency domain resource set list.

The frequency domain resource set list includes at least one frequency domain resource set, and the configuration parameter of a frequency domain resource set may include at least one of the following: a frequency domain resource set index, a subcarrier spacing, a starting resource unit of a frequency domain resource set, or the number of consecutive resource units. Each frequency domain resource set is configured based on a carrier corresponding to the subcarrier spacing in the configuration parameter of the frequency domain resource set, and the carrier is in a carrier list of the cell of the DU of the first node.

In an example, the first carrier resource configuration information may include at least one of a first reference carrier configuration or a frequency domain resource set list.

Figure 8:
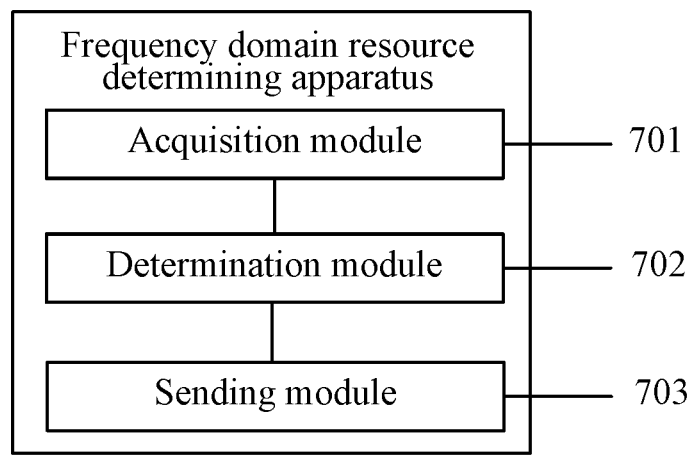
FIG. 8 is a structure diagram of another frequency domain resource determining apparatus according to an embodiment of the present application.

In some examples, as shown in FIG. 8, the apparatus may further include a sending module 703.

The sending module is configured to send first carrier resource configuration information to the cell of the DU of the apparatus.

In some examples, the first reference carrier configuration includes at least one of: a subcarrier spacing of a reference carrier, a frequency offset between the lowest frequency of a reference carrier and a reference point, a bandwidth of a reference carrier, a frequency band corresponding to a reference carrier, or a frequency location of a reference point.

Accordingly, the first carrier resource configuration information includes the frequency domain resource set list, and the frequency domain resource set list is determined based on the first reference carrier configuration.

In an example, the acquisition module is further configured to acquire second carrier resource configuration information sent by the control node.

The determination module is configured to determine a second reference carrier of a cell of a DU of a child node of the apparatus according to the second carrier resource configuration information.

The determination module is further configured to determine at least one frequency domain resource set of the cell of the DU of the child node of the apparatus based on the second reference carrier.

The second reference carrier includes a second starting resource block and M resource blocks starting from the second starting resource block, and M is configured in the second carrier resource configuration information or predefined.

In an example, the second carrier resource configuration information includes resource configuration information and carrier configuration information of the cell of the DU of the child node of the apparatus.

The resource configuration information includes at least one of a subcarrier spacing or a frequency domain resource set list.

The carrier configuration information includes at least one of an ARFCN, an operating frequency band, or a carrier list.

In an example, the determination module is configured to determine the second reference carrier to be a carrier whose subcarrier spacing is equal to the subcarrier spacing in the resource configuration information and which is in a carrier list of the cell of the DU of the child node of the apparatus; or the determination module is configured to determine a carrier corresponding to the subcarrier spacing in the resource configuration information to be the second reference carrier, where the carrier is in a carrier list of the cell of the DU of the child node of the first node; or the determination module is configured to determine the second starting resource block to be a starting resource block of a carrier in a carrier list of the cell of the DU of the child node of the first node, where the carrier list corresponds to the subcarrier spacing in the resource configuration information; or the determination module is configured to determine the second starting resource block to be a starting resource block of a carrier whose subcarrier spacing is equal to the subcarrier spacing in the resource configuration information and which is in a carrier list of the cell of the DU of the child node of the apparatus.

In an example, the second carrier resource configuration information includes at least one of a second reference carrier configuration or a frequency domain resource set list.

The second reference carrier configuration includes at least one of the following: a subcarrier spacing of a reference carrier, a frequency offset between the lowest frequency of a reference carrier and a reference point, a bandwidth of a reference carrier, a frequency band corresponding to a reference carrier, or a frequency location of a reference point.

In an example, the second carrier resource configuration information includes at least one of a frequency domain resource set list or an identity of a cell of the DU of the first node which is associated with a resource configuration of the cell of the DU of the child node of the apparatus.

In some examples, a frequency domain resource set of the cell of the DU of the child node of the apparatus is the same as a frequency domain resource set of the associated cell of the DU of the apparatus.

In some examples, the second reference carrier is the same as a reference carrier of the associated cell of the DU of the apparatus.

The frequency domain resource determining apparatus provided in this embodiment is configured to perform the frequency domain resource determining method in the embodiments shown in FIGS. 3 and 4. The implementation principles and technical effects of the frequency domain resource determining apparatus provided in this embodiment are similar to those of the frequency domain resource determining method, and the details are not repeated here.

Figure 9:
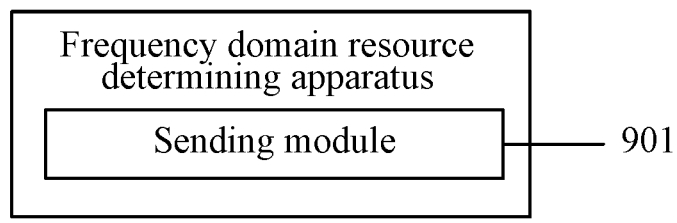
FIG. 9 is a structure diagram of another frequency domain resource determining apparatus according to an embodiment of the present application.

FIG. 9 shows a frequency domain resource determining apparatus according to an embodiment of the present application. As shown in FIG. 9, the apparatus includes a sending module 901.

The sending module is configured to send first carrier resource configuration information to a first node.

The first carrier resource configuration information is used for determining a first reference carrier of a cell of a DU of the first node, the first reference carrier is used for determining at least one frequency domain resource set of the cell of the DU of the first node, and the first reference carrier includes a first starting resource block and N resource blocks starting from the first starting resource block, where N is configured in the first carrier resource configuration information or N is predefined.

In an example, the first carrier resource configuration information includes at least one of a subcarrier spacing or a frequency domain resource set list.

In an example, the first carrier resource configuration information sent by the control node may include at least one of a frequency domain resource set list.

The frequency domain resource set list includes at least one frequency domain resource set, and the configuration parameter of a frequency domain resource set may include at least one of the following: a frequency domain resource set index, a subcarrier spacing, the starting resource unit of the frequency domain resource set, or the number of consecutive resource units. Each frequency domain resource set is configured based on a carrier corresponding to the subcarrier spacing in the configuration parameter of the frequency domain resource set, and the carrier is in a carrier list of the cell of the DU of the first node.

In an example, the first carrier resource configuration information includes at least one of a first reference carrier configuration or a frequency domain resource set list.

Figure 10:
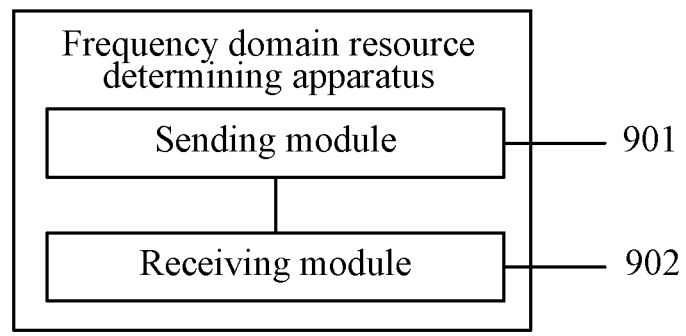
FIG. 10 is a structure diagram of another frequency domain resource determining apparatus according to an embodiment of the present application.

As shown in FIG. 10, in some examples, the apparatus may further include a receiving module 902.

The receiving module is configured to receive a first reference carrier configuration of the cell of the DU of the first node sent by the first node, where the first reference carrier configuration includes at least one of the following: a subcarrier spacing of a reference carrier, a frequency offset between the lowest frequency of a reference carrier and a reference point, a bandwidth of a reference carrier, a frequency band corresponding to a reference carrier, or a frequency location of a reference point.

In some examples, the first carrier resource configuration information includes the frequency domain resource set list, and the frequency domain resource set list is determined based on the first reference carrier configuration sent by the first node.

In an example, the sending module is further configured to send second carrier resource configuration information to the first node.

The second carrier resource configuration information is used for determining a second reference carrier of a cell of a DU of a child node of the first node, and the second reference carrier is used for determining at least one frequency domain resource set of the cell of the DU of the child node of the first node.

The second reference carrier includes a second starting resource block and M resource blocks starting from the second starting resource block, and M is configured in the second carrier resource configuration information or predefined.

In an example, the second carrier resource configuration information includes resource configuration information and carrier configuration information of the cell of the DU of the child node of the first node, where the resource configuration information includes at least one of a subcarrier spacing or a frequency domain resource set list, and the carrier configuration information includes at least one of an ARFCN, an operating frequency band or a carrier list.

In an example, the second carrier resource configuration information sent by the control node may include a frequency domain resource set list.

The frequency domain resource set list includes at least one frequency domain resource set, and the configuration parameter of a frequency domain resource set may include at least one of the following: a frequency domain resource set index, a subcarrier spacing, the starting resource unit of the frequency domain resource set, or the number of consecutive resource units. Each frequency domain resource set is configured based on a carrier corresponding to the subcarrier spacing in the configuration parameter of the frequency domain resource set, and the carrier is in a carrier list of the cell of the DU of the child node of the first node.

In an example, the second carrier resource configuration information includes at least one of a second reference carrier configuration or a frequency domain resource set list.

The second reference carrier configuration includes at least one of the following: a subcarrier spacing of a reference carrier, a frequency offset between the lowest frequency of a reference carrier and a reference point, a bandwidth of a reference carrier, a frequency band corresponding to a reference carrier, or a frequency location of a reference point.

In an example, the second carrier resource configuration information includes at least one of an identity of a cell of the DU of the first node or a frequency domain resource set list, where the cell of the DU of the first node is associated with a resource configuration of the cell of the DU of the child node of the first node.

In some examples, a frequency domain resource set of the cell of the DU of the child node of the first node is the same as a frequency domain resource set of the associated cell of the DU of the first node.

In some examples, the second reference carrier is the same as a reference carrier of the associated cell of the DU of the first node.

The frequency domain resource determining apparatus provided in this embodiment is configured to perform the frequency domain resource determining method in the embodiment shown in FIG. 6. The implementation principles and technical effects of the frequency domain resource determining apparatus provided in this embodiment are similar to those of the frequency domain resource determining method, and the details are not repeated here.

Figure 11:
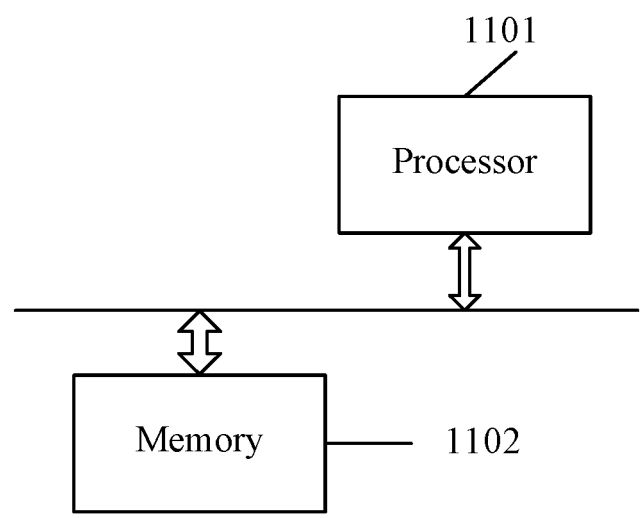
FIG. 11 is a structure diagram of a communication node according to an embodiment of the present application.

FIG. 11 is a structure diagram of a communication node according to an embodiment of the present application. As shown in FIG. 11, the node includes a processor 1101 and a memory 1102. The number of processors 1101 in the node may be one or more, and one processor 1101 is illustrated as an example in FIG. 11. The processor 1101 and the memory 1102 in the node may be connected via a bus or in other manners, and the connection via a bus is illustrated as an example in FIG. 11.

As a computer-readable storage medium, the memory 1102 may be configured to store software programs, computer-executable programs and modules, such as program instructions/modules (for example, the acquisition module 701 and the determination module 702 or the sending module 901 in the frequency domain resource determining apparatus) corresponding to the frequency domain resource determining method in the embodiment shown in FIG. 3, FIG. 4 or FIG. 6 of the present application. The processor 1101 performs the frequency domain resource determining method by running the software programs, instructions and modules stored in the memory 1102.

The memory 1102 may mainly include a program storage region and a data storage region, where the program storage region may store an operating system and an application program required by at least one function while the data storage region may store data created according to the use of the frequency domain resource determining apparatus. Additionally, the memory 1102 may include a high-speed random-access memory and may also include a non-volatile memory, such as at least one disk memory, a flash memory or another non-volatile solid-state memory.

In an example, if possible, the processor in the node may perform the frequency domain resource determining method through a hardware circuit such as a logic circuit or a gate circuit inside the processor.

An embodiment of the present application further provides a readable/writeable storage medium used for computer storage, the storage medium stores one or more programs, and the one or more programs are executable by one or more processors to perform a frequency domain resource determining method in the preceding embodiments.

The embodiments of the present application provide a frequency domain resource determining method and apparatus, a node and a storage medium. The method includes the following: The first node acquires first carrier resource configuration information sent by a control node; the first node determines a first reference carrier of a cell of a DU of the first node according to the first carrier resource configuration information; and the first node determines at least one frequency domain resource set of the cell of the DU of the first node based on the first reference carrier; where the first reference carrier includes a first starting resource block and N resource blocks starting from the first starting resource block, and N is configured in the first carrier resource configuration information or N is predefined. Through such implementations, the carrier-based frequency domain resource partition can be achieved.

It is to be understood by those of ordinary skill in the art that some or all steps in the preceding disclosed method and function modules/units in the device may be implemented as software, firmware, hardware and suitable combinations thereof.

In a hardware implementation, the division of the function modules/units described above does not necessarily correspond to the division of physical components. For example, one physical component may have multiple functions, or one function or step may be implemented by several physical components cooperatively. Some or all physical components may be implemented as software executed by a processor such as a central processing unit, a digital signal processor or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). As is well known to those of ordinary skill in the art, the term computer storage media include volatile and non-volatile, removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cassette, a magnetic tape, magnetic disk storage or other magnetic storage devices, or any other medium which can be used to store the desired information and which can be accessed by a computer. Additionally, as known to those of ordinary skill in the art, the communication media generally include computer-readable instructions, data structures, program modules or other data in a modulated data signal such as a carrier wave or other transport mechanisms and may include any information delivery media.

Only some embodiments of the present application are illustrated with reference to the drawings and are not intended to limit the scope of the present application. Any modification, equivalent substitution and improvement made by those skilled in the art without departing from the scope and spirit of the present application shall fall within the scope of the present application.

What is claimed is:

1. A frequency domain resource determining method, comprising:
    acquiring, by a first node, first carrier resource configuration information sent by a control node, wherein the first carrier resource configuration information comprises a subcarrier spacing and a configuration parameter of a frequency domain resource set;
    determining, by the first node, a first reference carrier of a cell of a distributed unit (DU) of the first node according to the subcarrier spacing in the first carrier resource configuration information and a carrier list of the cell of the DU of the first node; and
    determining, by the first node, at least one frequency domain resource set of the cell of the DU of the first node based on the first reference carrier and the configuration parameter of the frequency domain resource set;
    wherein the first reference carrier comprises a first starting resource block and N resource blocks starting from the first starting resource block, wherein N is configured in the first carrier resource configuration information, or N is predefined, and N is an integer.

2. The method of claim 1, wherein determining the first reference carrier of the cell of the DU of the first node according to the subcarrier spacing in the first carrier resource configuration information and the carrier list of the cell of the DU of the first node comprises one of the following:
    determining the first reference carrier to be a carrier whose subcarrier spacing is equal to the subcarrier spacing in the first carrier resource configuration information, wherein the carrier is in the carrier list of the cell of the DU of the first node;
    determining the first starting resource block to be a starting resource block of a carrier whose subcarrier spacing is equal to the subcarrier spacing in the first carrier resource configuration information, wherein the carrier is in the carrier list of the cell of the DU of the first node; or
    determining the first starting resource block to be a starting resource block of a carrier is in the carrier list of the cell of the DU of the first node, wherein the carrier list corresponds to the subcarrier spacing in the first carrier resource configuration information.

3. The method of claim 1, further comprising:
    acquiring, by the first node, resource configuration information of a cell of a DU of a child node of the first node and carrier configuration information of the cell of the DU of the child node of the first node, wherein the resource configuration information and the carrier configuration information are sent by the control node;
    determining, by the first node, a second reference carrier of the cell of the DU of the child node of the first node according to a subcarrier spacing in the resource configuration information and a carrier list in the carrier configuration information; and
    determining, by the first node, at least one frequency domain resource set of the cell of the DU of the child node of the first node based on the second reference carrier;
    wherein the second reference carrier comprises a second starting resource block and M resource blocks starting from the second starting resource block, wherein M is configured in at least one of the resource configuration information or the carrier configuration information, or M is predefined, and M is an integer.

4. The method of claim 3, wherein the carrier configuration information further comprises at least one of: an absolute radio frequency channel number (ARFCN), or an operating frequency band.

5. The method of claim 3, wherein determining the second reference carrier of the cell of the DU of the child node of the first node according to the subcarrier spacing in the resource configuration information and the carrier list in the carrier configuration information comprises one of the following:
    determining the second reference carrier to be a carrier whose subcarrier spacing is equal to the subcarrier spacing in the resource configuration information, wherein the carrier is in a carrier list of the cell of the DU of the child node of the first node;
    determining the second starting resource block to be a starting resource block of a carrier whose subcarrier spacing is equal to the subcarrier spacing in the resource configuration information, wherein the carrier is in a carrier list of the cell of the DU of the child node of the first node; or
    determining the second starting resource block to be a starting resource block of a carrier in a carrier list of the cell of the DU of the child node of the first node, wherein the carrier list corresponds to the subcarrier spacing in the resource configuration information.

6. A non-transitory read-writeable storage medium storing a computer program, wherein the computer program, when executed by a processor, implements the frequency domain resource determining method of claim 1.

7. The method of claim 1, wherein each of the at least one frequency domain resource set comprises at least one resource block.

8. The method of claim 1, further comprising:
    acquiring, by the first node, a resource configuration of a cell of a DU of a second node sent by the control node; wherein the first node and the second node provide a service for a same child node.

9. The method of claim 1, wherein one time-frequency resource unit of the cell of the DU of the first node corresponds to one resource attribute, the resource attribute is configured based on the at least one frequency domain resource set, the one time-frequency resource unit comprises one frequency domain resource set and one direction of symbols in one slot, and the resource attribute comprises at least one of hard (H), soft (S) or unavailable (NA).

10. A frequency domain resource determining method, comprising:
    sending, by a control node, first carrier resource configuration information to a first node;
    wherein the first carrier resource configuration information comprises a subcarrier spacing and a configuration parameter of a frequency domain resource set,
    the first carrier resource configuration information is used for determining a first reference carrier of a cell of a distributed unit (DU) of the first node, and the first reference carrier and the configuration parameter of the frequency domain resource set are used for determining at least one frequency domain resource set of the cell of the DU of the first node;

wherein the first reference carrier comprises a first starting resource block and N resource blocks starting from the first starting resource block, wherein N is configured in the first carrier resource configuration information, or N is predefined, and N is an integer.

11. The method of claim 10, further comprising:

sending, by the control node, resource configuration information of a cell of a DU of a child node of the first node and carrier configuration information of the cell of the DU of the child node of the first node to the first node;

wherein the resource configuration information and the carrier configuration information are used for determining a second reference carrier of the cell of the DU of the child node of the first node, and the second reference carrier is used for determining at least one frequency domain resource set of the cell of the DU of the child node of the first node;

wherein the second reference carrier comprises a second starting resource block and M resource blocks starting from the second starting resource block, wherein M is configured in at least one of the resource configuration information or the carrier configuration information, or M is predefined, and M is an integer.

12. The method of claim 10, wherein each of the at least one frequency domain resource set comprises at least one resource block.

13. The method of claim 10, further comprising:

sending, by the control node, a resource configuration of a cell of a DU of a second node to the first node; wherein the first node and the second node provide a service for a same child node.

14. The method of claim 10, wherein one time-frequency resource unit of the cell of the DU of the first node corresponds to one resource attribute, the resource attribute is configured based on the at least one frequency domain resource set, the one time-frequency resource unit comprises one frequency domain resource set and one direction of symbols in one slot, and the resource attribute comprises at least one of hard (H), soft(S) or unavailable (NA).

15. A non-transitory read-writeable storage medium storing a computer program, wherein the computer program, when executed by a processor, implements the frequency domain resource determining method of claim 10.

16. A communication node, comprising a processor, wherein the processor, when executing a computer program, implements the frequency domain resource determining method of claim 10.

17. A communication node, comprising a processor, wherein the processor, when executing a computer program, implements the following:

acquiring first carrier resource configuration information sent by a control node, wherein the first carrier resource configuration information comprises a subcarrier spacing and a configuration parameter of a frequency domain resource set;

determining a first reference carrier of a cell of a distributed unit (DU) of the communication node according to the subcarrier spacing in the first carrier resource configuration information and a carrier list of the cell of the DU of the communication node; and determining at least one frequency domain resource set of the cell of the DU of the communication node based on the first reference carrier and the configuration parameter of the frequency domain resource set;

wherein the first reference carrier comprises a first starting resource block and N resource blocks starting from the first starting resource block, wherein N is configured in the first carrier resource configuration information, or N is predefined, and N is an integer.

18. The communication node of claim 17, wherein the processor implements determining the first reference carrier of the cell of the DU of the communication node according to the subcarrier spacing in the first carrier resource configuration information and the carrier list of the cell of the DU of the communication node by one of the following:

determining the first reference carrier to be a carrier whose subcarrier spacing is equal to the subcarrier spacing in the first carrier resource configuration information, wherein the carrier is in the carrier list of the cell of the DU of the communication node;

determining the first starting resource block to be a starting resource block of a carrier whose subcarrier spacing is equal to the subcarrier spacing in the first carrier resource configuration information, wherein the carrier is in the carrier list of the cell of the DU of the communication node; or determining the first starting resource block to be a starting resource block of a carrier in the carrier list of the cell of the DU of the communication node, wherein the carrier list corresponds to the subcarrier spacing in the first carrier resource configuration information.

19. The communication node of claim 17, wherein each of the at least one frequency domain resource set comprises at least one resource block.

20. The communication node of claim 17, wherein the processor further implements:

acquiring a resource configuration of a cell of a DU of a second node sent by the control node; wherein the communication node and the second node provide service for a same child node.

* * * * *